Sept. 11, 1928.
R. F. TOOPE
1,684,334
AUTOMATIC POULTRY FEEDER
Filed April 7, 1927
2 Sheets-Sheet 1
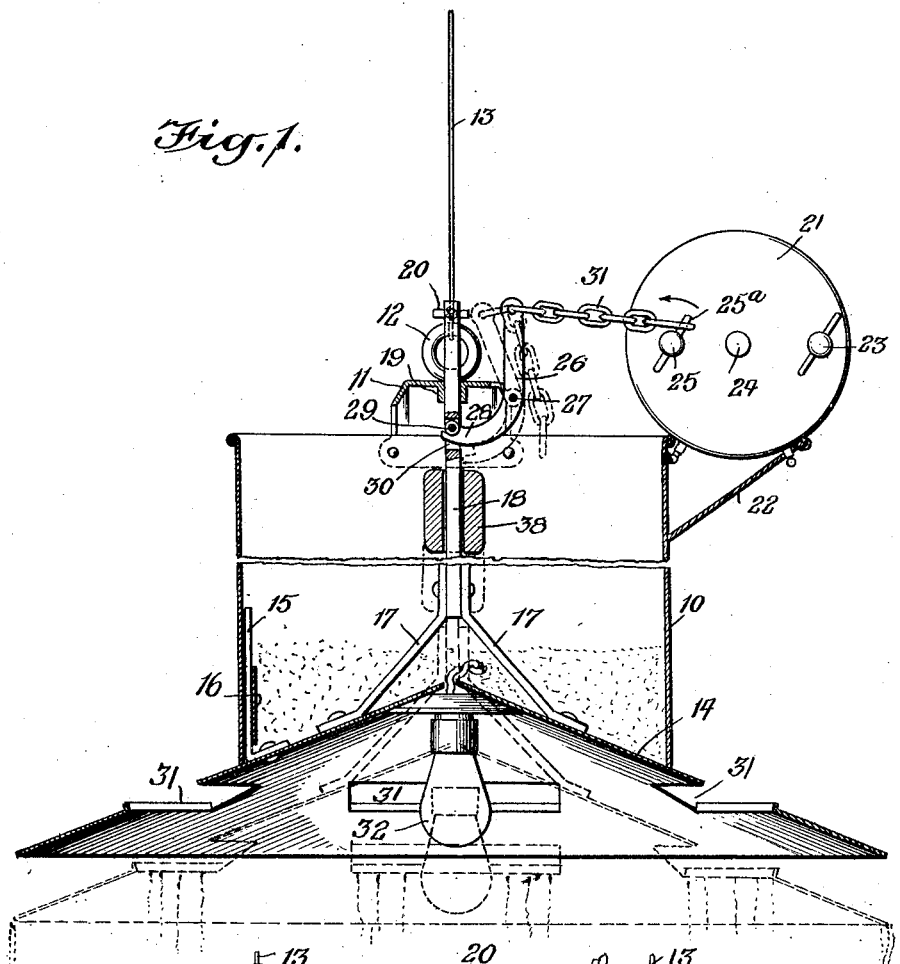
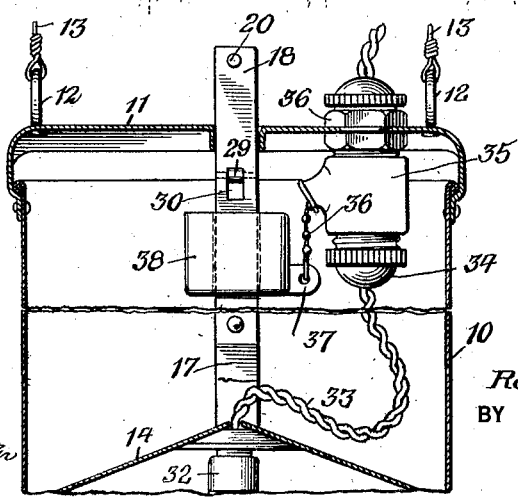
WITNESSES
INVENTOR
Robert F. Toope
BY
ATTORNEYS Sept. 11, 1928.  
R. F. TOOPE  
1,684,334  
AUTOMATIC POULTRY FEEDER  
Filed April 7, 1927 2 Sheets-Sheet 2

WITNESSES

INVENTOR  
Robert F. Toope  
BY  
ATTORNEYS

Patented Sept. 11, 1928.

1,684,334

UNITED STATES PATENT OFFICE.

ROBERT F. TOOPE, OF NEW HAVEN, CONNECTICUT.

AUTOMATIC POULTRY FEEDER.

Application filed April 7, 1927. Serial No. 181,757.

The present invention is concerned with the provision of an automatic poultry feeder, particularly with the provision of a device of this character in which a supply of feed is released and distributed at any predetermined hour by time controlled instrumentalities.

Preferably also, the release of the poultry feed is accompanied by the switching on of an illuminating means, and if desired, by the sounding of an audible alarm to arouse the poultry.

The advantage of illuminating a henhouse before daylight, or maintaining the same illuminated after dusk, is well understood. Numerous devices have been designed for providing automatic illumination at the desired times in order that the poultry may eat more food, and get more exercise, with the consequent forcing of the laying and the production of a greater number of eggs.

With all of these automatic lighting devices, it is necessary for an attendant to previously distribute grain over the floor of the poultry house by hand, so that when the lights are flashed on, the poultry will get the needed food and exercise. In addition to this inconvenience, the mere lighting of the lights does not always arouse all of the poultry. By the present invention, I overcome the disadvantages above noted by providing an automatic feed distributor operating synchronously with the lights, and by the provision of a noise making device which is sure to arouse the poultry to the presence of the light and the food.

An object of the present invention is to provide a substantially fool-proof automatic feeding and lighting apparatus of the general character above noted, which will be extremely simple and practical in construction, rugged and durable in use, and well suited to the requirements of economical manufacture.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 1 is a view in vertical section through an automatic feeding device embodying the present invention.

Fig. 2 is a similar view taken approximately at right angles to Fig. 1.

Figure 3:
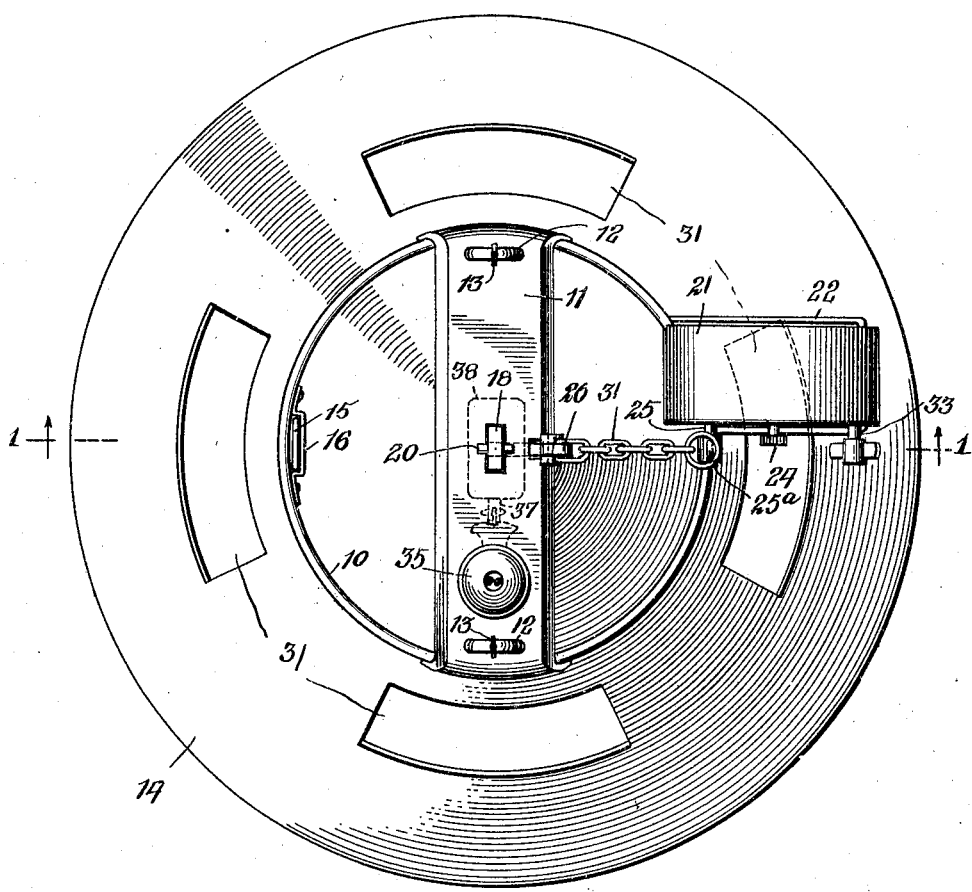
Fig. 3 is a top plan view of the device.

In the drawings I have used the reference character 10 to designate a hopper, preferably of cylindrical shape and open at its top.

A cross bar 11 extending across the open top of the hopper mounts anchoring eyes 12 or equivalent devices for sustaining chains or wires 13 by which the hopper may be hung from an appropriate overhead support.

The hopper is provided with a movable bottom in the nature of a conical feed distributing plate 14 normally held in proper position to prevent discharge of grain through the lower end of the hopper. This plate may be guided for vertical movement by any suitable number of arms 15 sliding in brackets 16 at the interior of the hopper.

Distributor plate and bottom 14 is preferably supported by brackets 17 connected to a vertically disposed rod 18 guided for sliding movement in sleeve 19 carried by the cross bar 11. Downward movement of the rod 18 is limited by a cross pin 20 mounted in the upper end of the bar or rod 18.

The distributor plate and closure 14 is normally held in the position of Fig. 1 and released by suitable timing mechanism, so that it may drop to the dotted line position of Fig. 1 at which time the feed is distributed.

This timing mechanism may be of any desired nature. I have shown it for the sake of illustration as an alarm clock 21 mounted on a suitable bracket 22 projecting from the wall of the hopper 10. This alarm-clock in addition to its usual winding shaft 24 includes the usual alarm shaft 25, which, when wound, is held by the usual ratchet mechanism (not shown) against turning movement until such predetermined time as the ratchet is released. Then the shaft 25 spins rapidly with the unwinding of the alarm spring (also not shown). One simple means of utilizing the spinning of the shaft 25 to control the dropping of the plate 14 has been illustrated. It includes a lever 26 of general hook shape pivoted intermediate its ends as at 27 to the cross bar 11, and including a free end 28 adapted to engage under a roller 29 mounted in a slot 30 in the rod 18. The other end of the lever 26 is connected by a chain 31 to the key 25$^a$ of the shaft 25. With the feed plate 14 disposed in the full line position of Fig. 1, and the free end 28 of the lever 26 engaged under the roller 29 in the slot 30, key 25$^a$ is turned slightly to the right, tightening the chain 31. Inasmuch as the shaft 25 is automatically locked against retrograde turning movement in the direction of the arrow until the alarm is released the weight of the closure plate 14 and its associated parts will be firmly sustained by the lever 26 and chain 31.

Upon release of the shaft 25, the key 25ª will spin in the direction of the arrow, becoming immediately disengaged from the chain 31, and permitting the weight of the rod 18 and its associated parts to swing the lever 26 about its pivot moving the end 28 out of the path of the roller, rod 18 dropping to the extent permitted by the pin 20.

As this occurs, the feed within the hopper 10 is distributed radially over the surface of the closure plate 14. Certain of the feed flows over the edges of the plate, and certain of the feed passes through openings 31 in the plate, so that the feed is distributed over a wide area.

As suggested above, the dropping of the distributor plate and closure 14 is preferably accompanied by the illumination of any suitable number of lighting devices. For the sake of illustration I have shown a lamp 32 mounted centrally beneath the conical plate 14. The wires 33 of this lamp may be connected by a plug 34 to a conventional type of switch 35 mounted as at 36 in the cross bar 11.

The switch is automatically controlled by the dropping of the bar 18. One method of accomplishing this result has been illustrated in which the switch is of the pull-chain type and its chain 36 is connected to an ear 37 on a weight 38, the latter being slidably mounted on the bar 18.

With the parts in the set position of Fig. 1, the weight is preferably sustained against downward movement by the upper ends of the bracket 17. Upon release of the rod 18, the weight may slide relatively to the rod in order to compensate for the difference between the throws of the weight and the distributor plate 14, and to prevent breakage of the pull chain.

Preferably the under surface of the conical plate 14 serves as a reflector, so that the lamp 32 will act as a flood light to illuminate the floor of the henhouse, and disclose the feed which is being distributed.

If the noise incidental to the dropping of the suddenly released feed plate and the actuation of its associated mechanism is not sufficient to arouse the fowls, an alarm may be sounded in the usual manner if necessary.

In conclusion it is to be noted that various forms of time-releasing, and automatic switching mechanism other than that illustrated might be used; the particular shape of the hopper and feed plate may be varied to suit the trade, or in accordance with the needs of individual users. In fact, numerous changes and alterations might be made in the general form and arrangement of parts described without departing from the invention. Hence I do not wish to limit myself to the details set forth, but shall consider myself at liberty to make such changes and alterations as fairly fall within the spirit and scope of the appended claim.

I claim:

In a poultry feeder comprising a cylindrical feed hopper, a movable conical bottom therefor constituting a distributor plate for the feed, a bracket secured to the inner face of the bottom adjacent the apex thereof; a rod rigidly connected with the upper end of the bracket, a cross bar at the upper end of the hopper and provided with a sleeved central opening through which said rod is adapted to have a limited sliding movement, said rod having a slot therethrough below said cross bar, a time-controlled lever detent normally positioned in said slot for holding the rod in elevated position to maintain the bottom in closed position, a lamp switch supported on the hopper from the cross-bar, a weight slidably mounted on said rod, a lamp suspended beneath the center of the conical bottom plate, an ear projecting from the aforesaid weight, a pull chain connecting said ear with the said lamp switch, said weight held in inactive position by said bracket and adapted to light said lamp through said switch upon release of the rod by the said time-controlled detent.

ROBERT F. TOOPE.